United States Patent
Lechkun et al.

(10) Patent No.: US 7,488,029 B2
(45) Date of Patent: Feb. 10, 2009

(54) INDEPENDENTLY OPENING DOORS FOR AN AUTOMOTIVE DOOR OPENING

(75) Inventors: David M. Lechkun, Shelby Township, MI (US); John M. Beranek, Ann Arbor, MI (US); Richard J. Wells, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 11/275,182

(22) Filed: Dec. 16, 2005

(65) Prior Publication Data

US 2007/0152473 A1 Jul. 5, 2007

(51) Int. Cl.
*B60J 5/04* (2006.01)
(52) U.S. Cl. .............................. 296/146.1; 296/146.11
(58) Field of Classification Search ............... 296/146.1, 296/146.11, 146.12; 49/208, 209, 246, 254, 49/502; 292/341.15–341.18, DIG. 21, DIG. 46
See application file for complete search history.

(56) References Cited

U.S. PATENT DOCUMENTS

| | | |
|---|---|---|
| 1,634,656 A | 7/1927 | Fatoux |
| 1,639,037 A | 8/1927 | Hollingshead |
| 1,676,599 A | 7/1928 | Breneman |
| 1,869,274 A | 7/1932 | Phillips |
| 1,951,863 A | 3/1934 | de Vizcaya |
| 1,961,205 A | 6/1934 | de Vizcaya |
| 2,084,600 A | 6/1937 | Sparkman |
| 2,177,826 A | 10/1939 | Hansen |
| 2,567,294 A | 9/1951 | McClintock |
| 2,733,096 A | 1/1956 | Waterhouse et al. |
| 2,827,321 A | 3/1958 | Leslie et al. |
| 2,870,477 A | 1/1959 | Anthony et al. |
| 2,937,043 A | 5/1960 | Griswold, Jr. et al. |

(Continued)

FOREIGN PATENT DOCUMENTS

DE 3343013 C2 6/1985

(Continued)

OTHER PUBLICATIONS

Joe Miller, "GM: New Products At Record Pace—Mopar, Mercedes Will Share Depots", Automotive News, Aug. 14, 2000.

(Continued)

*Primary Examiner*—Glenn Dayoan
*Assistant Examiner*—Gregory Blankenship
(74) *Attorney, Agent, or Firm*—Damian Porcari; Brooks Kushman P.C.

(57) ABSTRACT

An automotive vehicle is disclosed with a pillarless door opening for occupant ingress and egress. The first door is pivotally connected to the vehicle at a first end with a second end that extends to a central region of the door opening in the closed position. A second door has a first end translatably connected to the vehicle and a second end translatably connected to the vehicle adjacent to the central region of the opening at a closed position. The first door and the second door cooperate to close the opening. The second door can be translated relative to the vehicle to an intermediate position for providing clearance from the first door. One of the second door ends is detachable from the vehicle for pivoting the second door to an open position.

20 Claims, 9 Drawing Sheets

U.S. PATENT DOCUMENTS

| | | | |
|---|---|---|---|
| 2,997,336 | A | 8/1961 | Huggins et al. |
| 3,085,297 | A | 4/1963 | Linderfelt |
| 3,149,864 | A | 9/1964 | Foster |
| 3,150,408 | A | 9/1964 | Beisky |
| 3,158,395 | A | 11/1964 | Smith |
| 3,272,552 | A | 9/1966 | Park |
| 3,600,742 | A | 8/1971 | Barger |
| 3,666,305 | A | 5/1972 | Schlichter |
| 3,757,969 | A | 9/1973 | Smith |
| 3,758,990 | A | 9/1973 | Belanos |
| 3,873,149 | A | 3/1975 | Churchman |
| 3,907,357 | A | 9/1975 | Davis, Jr. |
| 4,143,281 | A | 3/1979 | Appley |
| 4,162,097 | A | 7/1979 | Scribner |
| 4,358,151 | A | 11/1982 | Wood |
| 4,372,603 | A | 2/1983 | Stanczak et al. |
| 4,650,241 | A | 3/1987 | Motonami et al. |
| 4,653,229 | A | 3/1987 | Feucht et al. |
| 4,655,499 | A | 4/1987 | Piper |
| 4,719,665 | A | 1/1988 | Bell |
| 4,773,126 | A | 9/1988 | Voss |
| 4,930,836 | A | 6/1990 | Grinn |
| 4,952,009 | A | 8/1990 | Mountz et al. |
| 4,973,103 | A | 11/1990 | Imajyo et al. |
| 5,140,316 | A | 8/1992 | DeLand et al. |
| 5,244,247 | A | 9/1993 | Kuwabara |
| 5,282,293 | A | 2/1994 | Pedoeem |
| 5,297,841 | A | 3/1994 | Siedlecki |
| 5,316,365 | A | 5/1994 | Kuhlman et al. |
| 5,347,757 | A | 9/1994 | Losito |
| 5,398,988 | A | 3/1995 | DeRees et al. |
| 5,491,875 | A | 2/1996 | Siladke et al. |
| 5,499,853 | A | 3/1996 | Pourian |
| 5,551,197 | A | 9/1996 | Repp et al. |
| 5,561,887 | A | 10/1996 | Neag et al. |
| 5,577,793 | A | 11/1996 | Kobasic |
| 5,632,065 | A | 5/1997 | Siladke et al. |
| 6,196,618 | B1 * | 3/2001 | Pietryga et al. ........ 296/146.11 |
| 6,305,737 | B1 * | 10/2001 | Corder et al. .......... 296/146.11 |
| 6,386,621 | B1 * | 5/2002 | Kozak et al. ................ 296/155 |
| 6,827,390 | B2 * | 12/2004 | Zummallen et al. .... 296/146.11 |
| 6,851,743 | B2 * | 2/2005 | George et al. ................ 296/202 |
| 6,966,600 | B2 * | 11/2005 | Moriyama ............... 296/146.1 |
| 6,997,504 | B1 * | 2/2006 | Lang et al. ............. 296/146.11 |
| 7,000,976 | B2 * | 2/2006 | Azzouz et al. ........... 296/146.1 |
| 7,096,538 | B2 * | 8/2006 | Liang et al. .................... 16/366 |
| 7,097,229 | B1 * | 8/2006 | Chernoff ................. 296/146.1 |
| 7,144,064 | B2 * | 12/2006 | Azzouz et al. ........... 296/146.1 |
| 7,178,853 | B2 * | 2/2007 | Oxley et al. ............ 296/146.11 |

FOREIGN PATENT DOCUMENTS

| | | |
|---|---|---|
| DE | 3537304 A1 | 4/1987 |
| EP | 0220414 A2 | 5/1987 |
| EP | 0306349 A1 | 3/1989 |
| EP | 0342915 A2 | 11/1989 |
| EP | 0348034 A2 | 12/1989 |
| FR | 2634426 A1 | 1/1990 |
| GB | 621274 | 4/1949 |
| JP | S5317226 U | 2/1978 |
| JP | S53017226 Y | 5/1978 |
| JP | S53156214 U | 12/1978 |
| JP | S5744075 A | 3/1982 |
| JP | S59170012 U | 11/1984 |
| JP | H10109662 A | 4/1998 |

OTHER PUBLICATIONS

Joe Miller, "GM: New Products At Record Pace—Mopar, Mercedes Will Share Depots", Automotive News, Aug. 28, 2000.

The Land Yacht Marina's Cargo Ships—A Salute to Station Wagons, 1998.

Website: http://www.stationwagon.com/gallery/1947 Studebaker Champion.html, 1947 Studebaker Champion Station Wagons.

Website: http://www.hubcapcafe.com/ocs/pages01/ford1403.html, 1914 Ford Depot Hack.

Website: http://www.hubcapcafe.com/ocs/pages01/ford1403.html, 1926 Ford Model T Depot Hack.

Website: http://www.stationwagon.com/gallery/1986 Buick 6-door.html, 1986 Buick 6-Door Station Wagon.

Website: http://www.falconman.com/fullbrochures/66evullbrochure.htm, 1966 Ford Econoline Van Brochure.

Website: http://www.CanadianDriver.com, K5 Comeback Concept.

Website: http://www.autopedia.com/Ford/96/Econo.html, 1996 Econoline.

www.Nerac.com, Demo: Suicide Doors, 15 pages.

Paris Auto Show, Renault Concept Ellypse, Sep. 2002, 9 pages.

North American International Auto Show (Detroit), Lincoln Concept Navicross, Jan. 2003, 10 pages.

North American International Auto Show (Detroit), Buick Concept Ciclo - Rain Drop, Jan. 2002, 12 pages.

North American International Auto Show (Detroit), Buick Concept LaCrosse, Jan. 2000, 13 pages.

Autonet.ca - 2005 Ford concept Iosis Ford going for gold with Iosis, 3 pages.

www.baileycar.com/phantom, 6 pages.

www.wheels24.com.za/Wheels24/News/0,, 1369-1372__1814783,00.html, Motoring - Nissan sports car feast looms, 4 pages.

www.autogallery.org.ru/fiat1500.html, Oldtimer gallery. Cars. FIAT-1500, 2 pages.

paultan.org/archives/2005/09/29/hyundai-portico-concept, Hyundai Portic Concept paultan.org - Paul Tan's Raves and Rants on the Automotive I . . . , 10 pages.

www.telegraph.co.uk, The Project, 2 pages.

www.ottawahyundai.com/oh04/news/news12.html, Welcome to West Ottawa Hyndai, 4 pages.

* cited by examiner

INDEPENDENTLY OPENING DOORS FOR AN AUTOMOTIVE DOOR OPENING

BACKGROUND OF THE INVENTION

1. Field of the Invention

The invention relates to vehicle door systems, more particularly to door systems for a pillarless door opening.

2. Background Art

Automotive vehicles are often provided with multiple doors on a common body side of the vehicle. Typically, a pair of adjacent doors on a common body side of a vehicle open rearward facing with respect to the vehicle. Such rearward facing adjacent doors are generally each mounted to an associated pillar. Therefore, each door is provided with a corresponding door opening.

The prior art has combined openings of adjacent doors into a common door opening. Such door openings have been provided as a pillarless door opening, and have been utilized for trucks or sport utility vehicles having more than one row of seats. The pillarless door opening is provided without a center pillar between a front row and rear row seats. In order to provide lateral support to the vehicle body, generally both front and rear doors interlock and collectively provide lateral structural support. Since both front and rear doors are pivotally connected to the vehicle body, the doors are typically provided such that a user must open a front door, before opening or closing the rear door.

SUMMARY OF THE INVENTION

In one embodiment of the present invention, an automotive vehicle is provided with a body opening without a pillar for occupant ingress and egress. A first door has a first end pivotally connected to the vehicle about an axis adjacent to a perimeter of the vehicle body opening. A second end of the first door extends to a central region of the opening in a closed position, and extends away from the opening in an open position. A second door has a first end that is translatably connected to the vehicle adjacent to the perimeter of the opening and spaced apart from the first end of the first door. A second end of the second door is also translatably connected to the vehicle at a location that is adjacent to the central region of the opening at a closed position of the second door. The first door and second door cooperate to close the body opening when both doors are in the closed position. The second door is translatable relative to the vehicle on a fixed path of translation such that the ends of the second door are translated from the vehicle to an intermediate position that provides clearance from the first door, when the first door is closed. One of the second door ends is detachable from the vehicle for pivoting the second door relative to the vehicle from the intermediate position to an open position. This embodiment is a non-limiting example of an implementation of the claimed invention.

In another embodiment of the present invention, an automotive vehicle is provided with a pair of opposed outwardly opening doors on one side of a vehicle body to enclose a pillarless door opening. The vehicle has a forward door hinged to the vehicle adjacent a front edge of the pillarless door opening for pivotal movement about a generally vertical first hinge axis between an open position and a closed position. A forward door latch mechanism is provided for releasably latching the forward door to the vehicle body. A rearward door is provided hinged to the vehicle adjacent a rear edge of the pillarless door opening. The rearward door has a spaced apart front edge and a rear edge sized to close the pillarless door opening in cooperation with the forward door when closed. A rear link member has a fixed end pivotally attached to the vehicle adjacent the rear edge of the pillarless door opening. The rear link member also has a distal end that is movable along an arcuate path and is pivotally attached to the rearward door adjacent the rear edge for enabling rotation of the rearward door about a generally vertical second hinge axis between an open position and a substantially closed position. A front link member has a fixed end pivotally attached to the pillarless door opening forward of the rearward link member, and has a distal end movable along an arcuate path about the first end. A releasable connector is provided oriented adjacent the front edge of the rearward door for releasably engaging the distal end of the front link member. A locking mechanism is provided cooperating with the vehicle body and at least one of the rearward door and rear link member such that the rear link is capable of pivoting between an outwardly extending state with the rearward door in the substantially closed position and with the releasable connector engaging the distal end of the front link member, and an inwardly retracted locked state in which the rearward door is moved forward and inward to a closed state and securely held within the pillarless door opening.

In yet another embodiment of the present invention, an automotive vehicle is provided with a pair of opposed outwardly opening doors on one side of a vehicle body to enclose a pillarless door opening. The vehicle has a forward door hinged to the vehicle adjacent a front edge of the pillarless door opening for pivotal movement about a generally vertical first hinge axis between an open position and a closed position. A forward door latch mechanism is provided for releasably latching the forward door to the vehicle body. A rearward door is provided hinged to the vehicle adjacent a rear edge of the pillarless door opening. The rearward door has a spaced apart front edge and a rear edge sized to close the pillarless door opening in cooperation with the forward door when closed. A rear link member has a fixed end pivotally attached to the vehicle adjacent the rear edge of the pillarless door opening. A rearward door forward latch assembly is provided with a first latch member affixed to the vehicle and a corresponding second latch member affixed to the rear door adjacent the front edge. One of the first and second latch members releasably engages the other at an engagement location allowing limited forward movement of the rear door relative to the vehicle body while the first and second latch members are engaged. A locking mechanism is provided cooperating with the vehicle body and at least one of the rearward door and rear link member. The rear link member is capable of pivoting between an outwardly extended state with the rearward door in the substantially closed position and the first and second latch members initially engaged, and an inwardly retracted lock state in which the rearward door is moved forward and inward to a closed state and securely held within the pillarless door opening.

The above aspects, objects, embodiments, benefits and advantages of the present invention are apparent in the attached figures and in the detailed description of embodiments of the invention below.

DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference now to FIGS. 1-5, an automotive vehicle 20 is illustrated in accordance with the present invention. The automotive vehicle 20 is depicted as an extended cab pickup truck, however, any automotive vehicle is contemplated within the spirit and scope of the present invention.

The vehicle 20 has a pair of doors on one lateral side of a vehicle body 22. The doors are referred to as a front door 24 and a rear door 26, for purpose of description of the embodiment of FIGS. 1-5. However, it is understood that the features of the front door 24 discussed herein may be incorporated into a rear door and the features of the rear door 26 discussed herein may be incorporated into a front door. Additionally, the features of either door 24, 26 may be incorporated into any door regardless of forward, rearward or lateral spatial relationship. For example, a pair of adjacent doors may be provided on a rear end of a vehicle, such as a sport utility vehicle, a cargo vehicle, or the like.

The vehicle body 22 includes a door opening 28, which is closed and sealed collectively by the front door 24 and the rear door 26. To facilitate occupant ingress and egress, the door opening 28 is a pillarless door opening, without a center pillar dividing a front row 30 and a rear row 32 of the passenger compartment. Without a center pillar, often referred to as a B-pillar, less obstacles are provided within the door opening 28 for ease in entering and exiting the vehicle. Additionally, it is typical for utilization of the second row 32 for transporting objects other than occupants. Accordingly, it is common that the seats within the rear row 32 are collapsible for providing a compact area for transporting cargo. Without a center pillar, an enlarged door opening 28 is provided for loading and unloading of cargo within the passenger compartment.

An aspect of the prior art is to provide a front door and a rear door each pivotally connected to a vehicle body, and overlapping in a central region such that the front door must be open in order to open and close the rear door. The doors typically overlap to latch together. The vehicle 20 of the present invention overcomes this limitation by providing independently opening doors 24, 26.

The front door 24 is hinged to the vehicle proximate to a forward region of a perimeter of the door opening 28. The front door 24 is hinged to the vehicle body 22 about a generally vertical axis 34 so that the front door 24 may open facing rearward from the closed position illustrated in FIGS. 1-4 to the open position illustrated in FIG. 5. The front door 24 includes a conventional latch mechanism for latching the door in the closed position. The front door 24 includes an exterior door handle 36 and an interior door handle for actuating the latch mechanism, which disengages a rear end 38 of the front door 24 from the vehicle body. Once unlatched, the rear end 38 of the front door 24 may be pivoted away from the vehicle body 22 as the vehicle door 24 pivots about the first hinge axis 34 proximate to a front end 40 of the front door 24.

The front door 24 and the rear door 26 collectively meet in a central region 42 of the door opening 28 for closing and sealing the door opening 28. The rear door 26 includes a front end 44 that engages the front door rear end 38 at the central region 42 of the door opening 28. The rear door 26 has a rear end 46 that engages the perimeter of the door opening 28 at a rearward region, commonly referred to as a C-pillar. The rear door 26 pivots about a generally vertical axis 48 for reaching the open position illustrated in FIGS. 4 and 5. Since the front door rear end 38 and the rear door front end 44 engage at the central region 42 of the door opening 28, an interference is provided preventing independent opening of the front and rear doors 24, 26 by single-axis pivoting only. Accordingly, one of the doors is translatably mounted to the vehicle body 22 for translating the door before pivoting the door open.

As illustrated in FIGS. 1-5, the rear door 26 is mounted to the vehicle body 22 for translation relative to the vehicle body for providing clearance between the rear door front end 44 and the front door rear end 38 so that the second door 26 may be subsequently pivoted to the open position.

Figure 1:
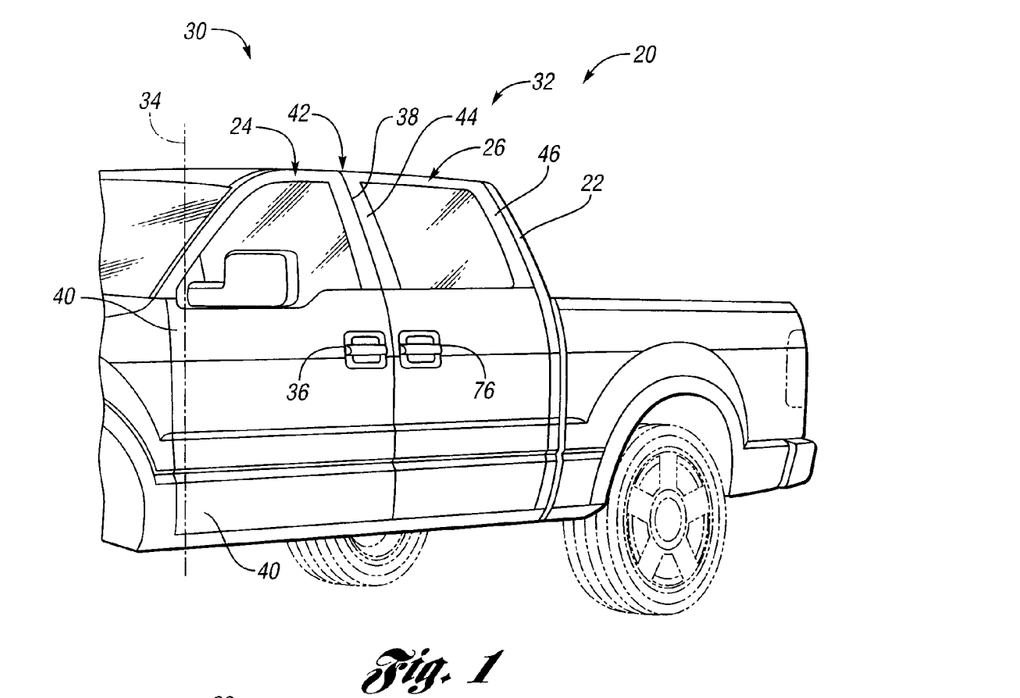
FIG. 1 is a partial perspective view of an automotive vehicle in accordance with the present invention, illustrated with a front door and a rear door in a closed position.
Figure 2:
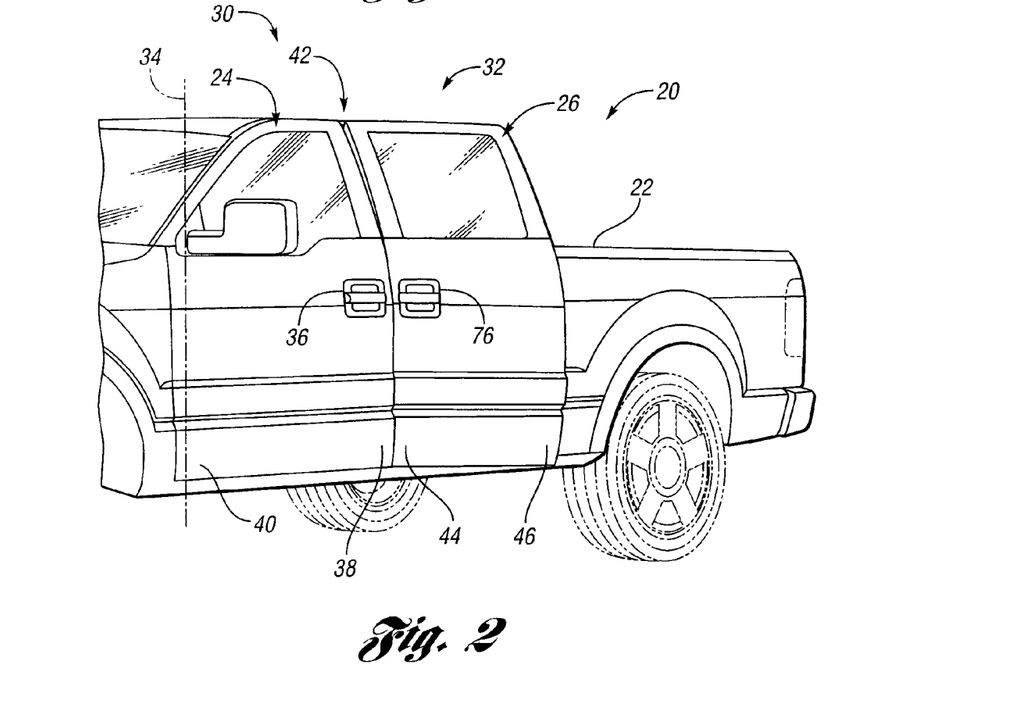
FIG. 2 is a partial perspective view of the automotive vehicle of FIG. 1, illustrated with the rear door in an intermediate position.

With reference to FIG. 1, the rear door 26 is illustrated in the closed position. Subsequently, the rear door 26 is translated to a first intermediate position illustrated in FIG. 2. In the first intermediate position of the rear door 26, the rear door rear end 46 translates laterally outboard from the vehicle body 22 while the rear door front end 44 begins translation rearward and away from the front door rear end 40.

Subsequently, the rear door 26 is translated to a second intermediate position, illustrated in FIG. 3 wherein the rear door rear end 46 translates laterally away from the vehicle body 22 and rearward relative to the front door, while the rear door front end 44 translates rearward relative to the front door rear end 38 while also translating laterally outboard from the vehicle body 22. In the second intermediate position of FIG. 3, a front edge of the rear door front end 44 is disengaged from the front door rear end 38. Also, a rear edge of the rear door rear end 46 is disengaged from the door opening 28.

Figure 3:
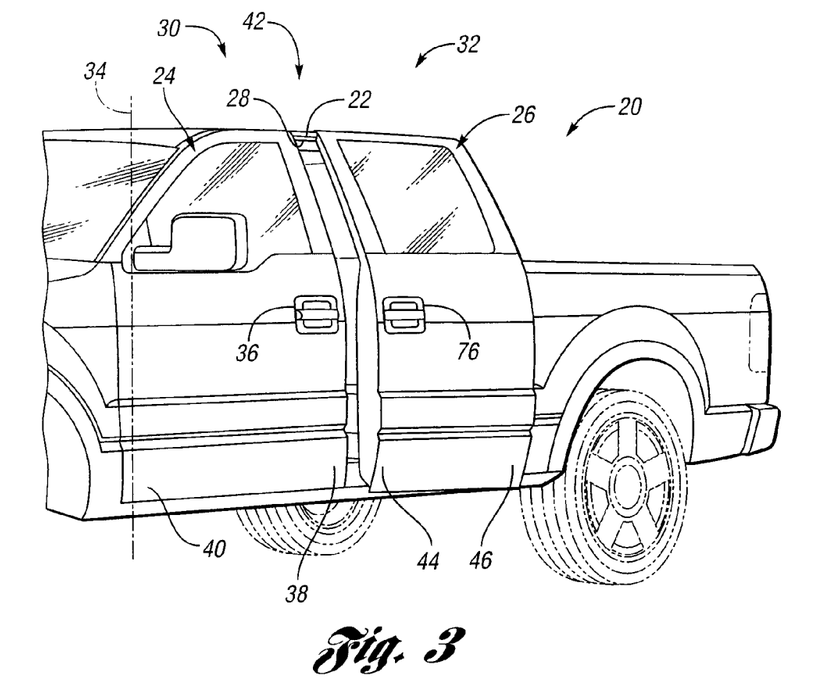
FIG. 3 is another partial perspective view of the automotive vehicle of FIG. 1, illustrated with the rear door in another intermediate position.
Figure 4:
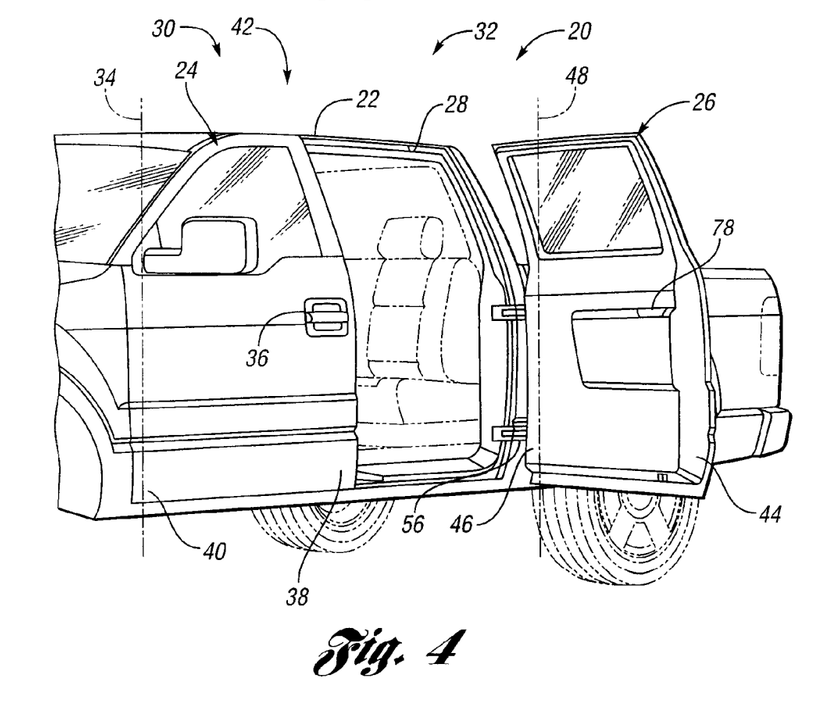
FIG. 4 is another partial perspective view of the automotive vehicle of FIG. 1, illustrated with the rear door in an open position.
Figure 5:
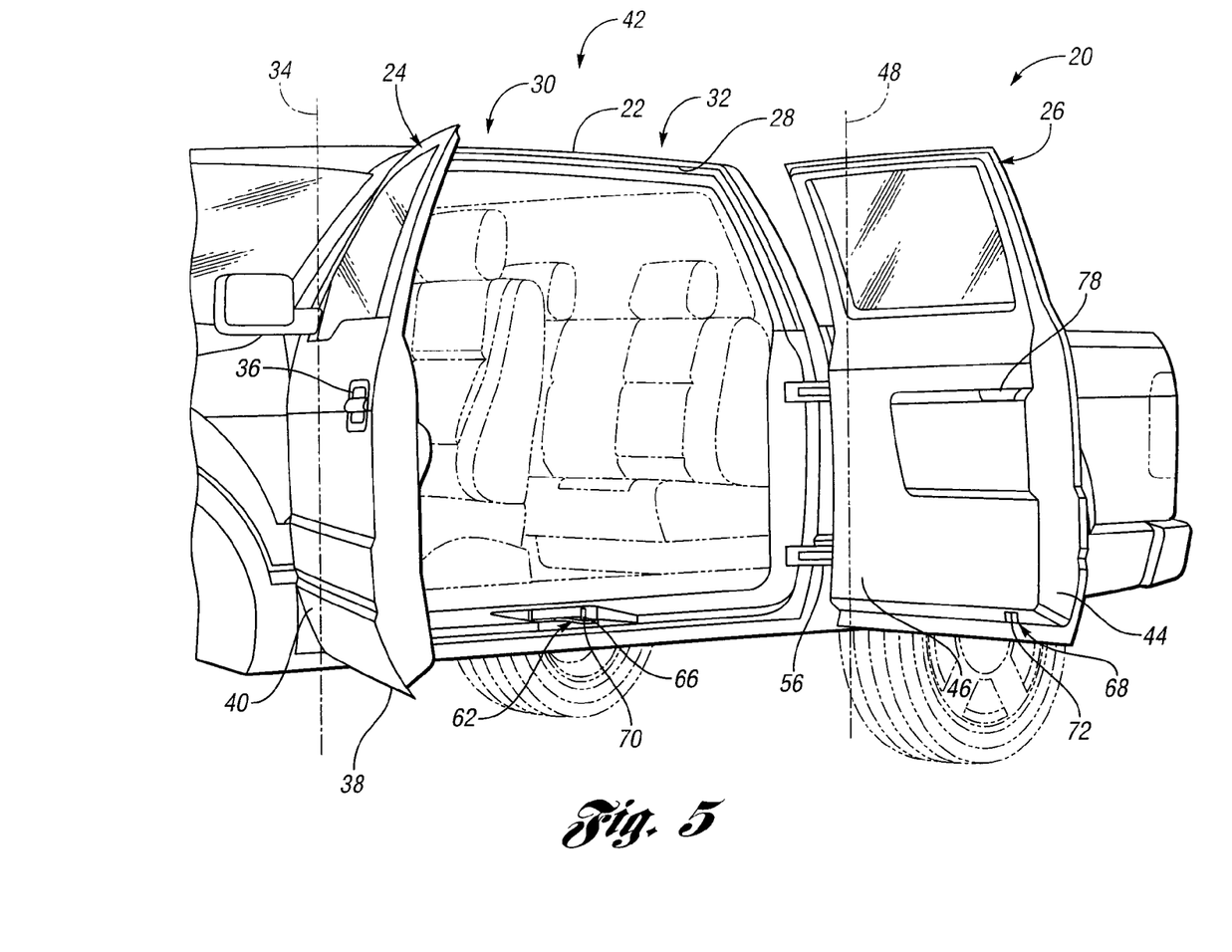
FIG. 5 is yet another partial perspective view of the automotive vehicle of FIG. 1, illustrated with the front door and the rear door in an open position.

Upon reaching the second intermediate position illustrated in FIG. 3, the rear door 26 may be pivoted about the second hinge axis 48 to the open position illustrated in FIG. 4. Thus, the rear door 26 may be opened independent of the front door 24 for independent ingress and egress to the rear row 32. Likewise, the front door 24 may be opened independent of the rear door by merely pivoting the front door open. Additionally, both doors 24, 26 may be opened for maximizing the pillarless door opening 28 for ingress/egress and loading and unloading of cargo.

Figure 6:
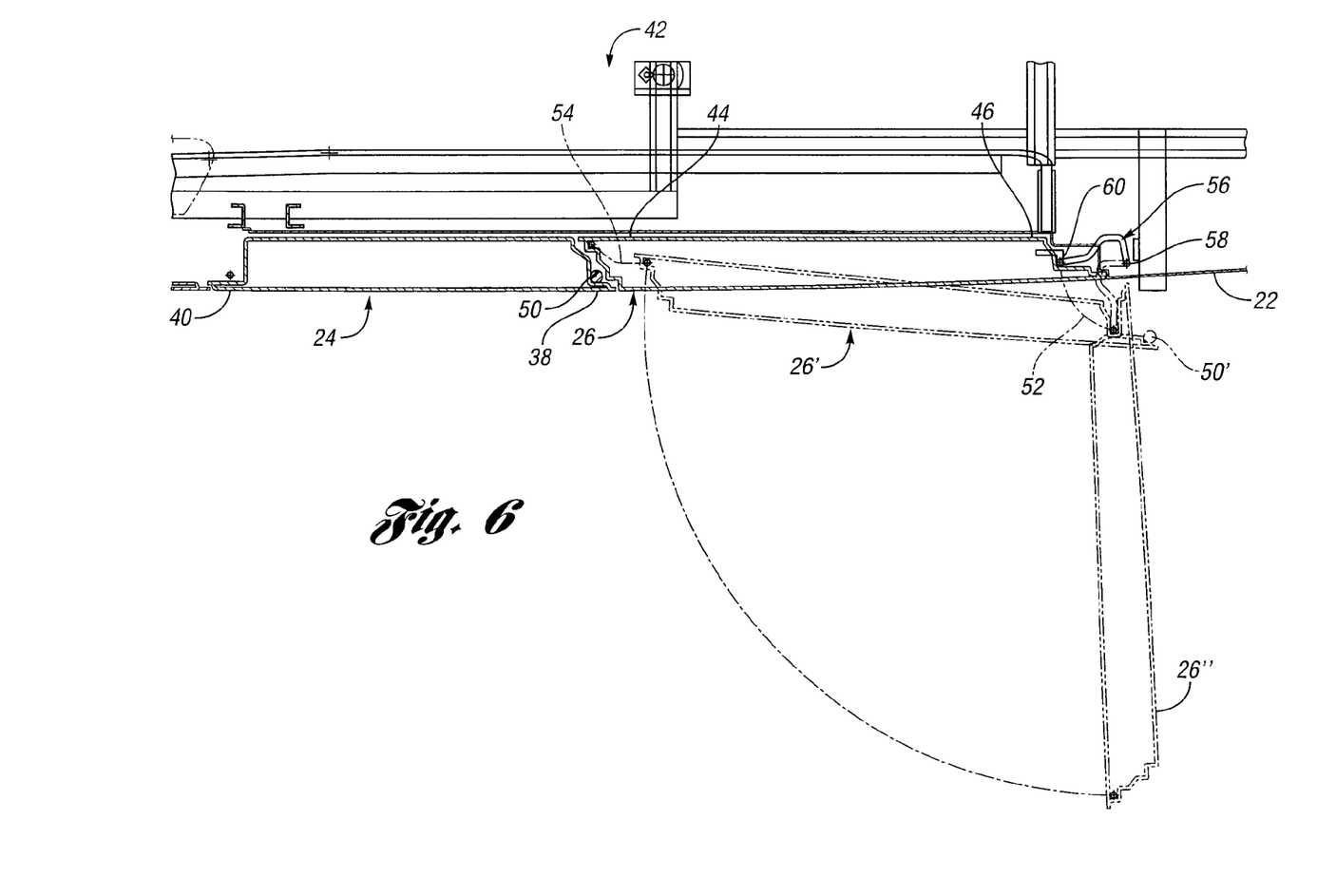
FIG. 6 is a top plan partial section view schematically illustrating the front and rear door of the automotive vehicle of FIG. 1, in closed positions, the rear door being illustrated in phantom in the second intermediate position and in the open position.

With reference now to FIG. 6, the front door 24 and the rear door 26 are illustrated in a top plan partial section view. The front door 24 and the rear door 26 are illustrated in solid in the closed position. The front door rear end 38 overlaps the rear door front end 44. Accordingly, an elastomeric seal 50 is provided therebetween for sealing the door opening 28. The elastomeric seal 50 is mounted to one of the front door rear end 38 and the rear door end 44 and provides a weather-tight connection therebetween. Another elastomeric seal 50' may provided for sealing engagement of the rear door rear end 46 to the vehicle body 22 at the pillarless door opening 28.

Further, by overlapping the front door rear end 38 and the rear door front end 44, the central region 42 is structurally enhanced for providing lateral structural support to the door system. In the absence of a B-pillar, the cooperation of the front door rear end 38 and the rear door front end 44 provides structural support for lateral loads associated with lateral impacts and rollovers.

In FIG. 6, the second door 26 is illustrated in phantom in the second intermediate position and is referenced generally by 26'. Upon reaching the second intermediate position at 26', the second door 26 may be pivoted to the open position, which is also illustrated in phantom and indicated generally by reference numeral 26".

The second door 26 is mounted to the vehicle body 22 for a fixed and repeatable path of translation. As the rear door 26 is translated to the second intermediate position 26', the rear door rear end 46 translates laterally outboard and rearward of the front door 24. The rear door rear end 46 travels on an arcuate path 52 illustrated in FIG. 6. The rear door front end 44 also translates rearward relative to the front door 24 and laterally outboard relative to the vehicle body 22. The rear door front end 44 travels along an arcuate path 54, which is also illustrated in FIG. 6.

The motion of the rear door 26 from the closed position to the second intermediate position 26' is often referred to as 'kick-out' in the context of sliding doors for vans, minivans and other vehicles. The paths 52, 54 of the rear door rear end 46 of the rear door front end 44 may be provided in cooperation with slots, linkages or the like. The rear door rear end path 52 and the rear door front end path 54 may form any pattern, linear, arcuate or the like that is sufficient for translating the rear door 26 to a position for pivoting the rear door 26 relative to the vehicle body 22. Unlike sliding doors, the rear door 26 only provides sufficient translation for clearance to pivot to the open position.

The translation of the second door 26 is adequately provided by a four bar mechanism, such as a slider crank mechanism or a four bar linkage. As illustrated in FIG. 6, a rear link 56 is provided with a fixed end 58 pivotally attached to the vehicle body 22. The rear link 56 also has a distal end 60 pivotally attached to the rear door rear end 46. The rear link distal end 60 provides the translation of the rear door rear end 46 along the path 52. Additionally, upon reaching the second intermediate position 26', the rear door 26 is permitted to pivot at the rear link distal end 60 about the second hinge axis 48. The rear door front end path 54 may be provided by a slot, a slider crank mechanism or by another link.

Referring now to FIGS. 7 to 10, the rear door 26 is illustrated mounted to a linkage for translating the rear door 26 relative to the vehicle body 22. The linkage is illustrated as a four bar linkage. The vehicle body 22 serves as a fixed link. As discussed above, the rear link 56 is pivotally connected to the vehicle body and the second door 26. The second door 26 also defines a link for translation relative to the vehicle body 22. A front link 62 is provided with a fixed end 64 pivotally attached to the vehicle body 22 within the pillarless door opening 28 forward of the rear link 56. The front link 62 has a distal end 66 pivotally connected to the rear door 26.

Figure 8:
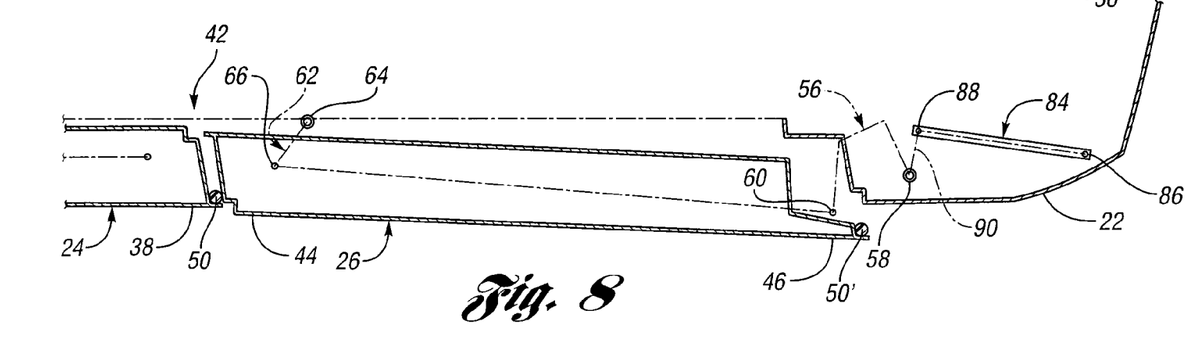
FIG. 8 is a top plan partial section view of the rear door of the automotive vehicle of FIG. 1, illustrated in the first intermediate position.
Figure 9:
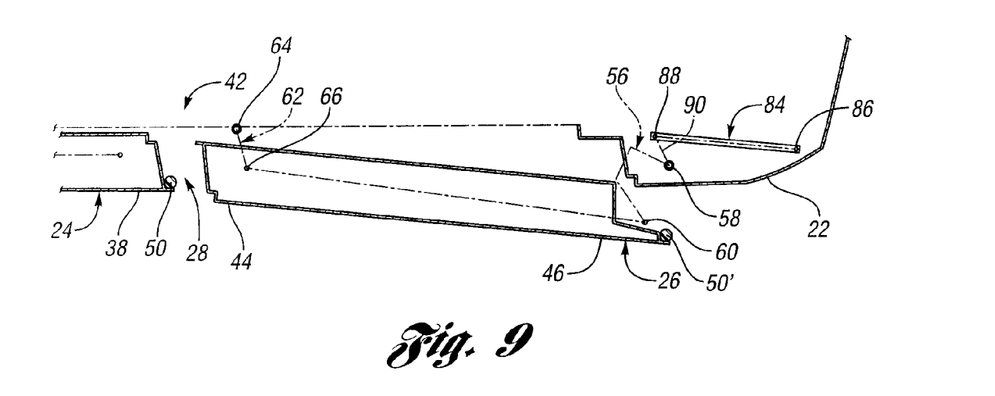
FIG. 9 is a top plan partial section view of the rear door of the automotive vehicle of FIG. 1, illustrated in the second intermediate position.
Figure 10:
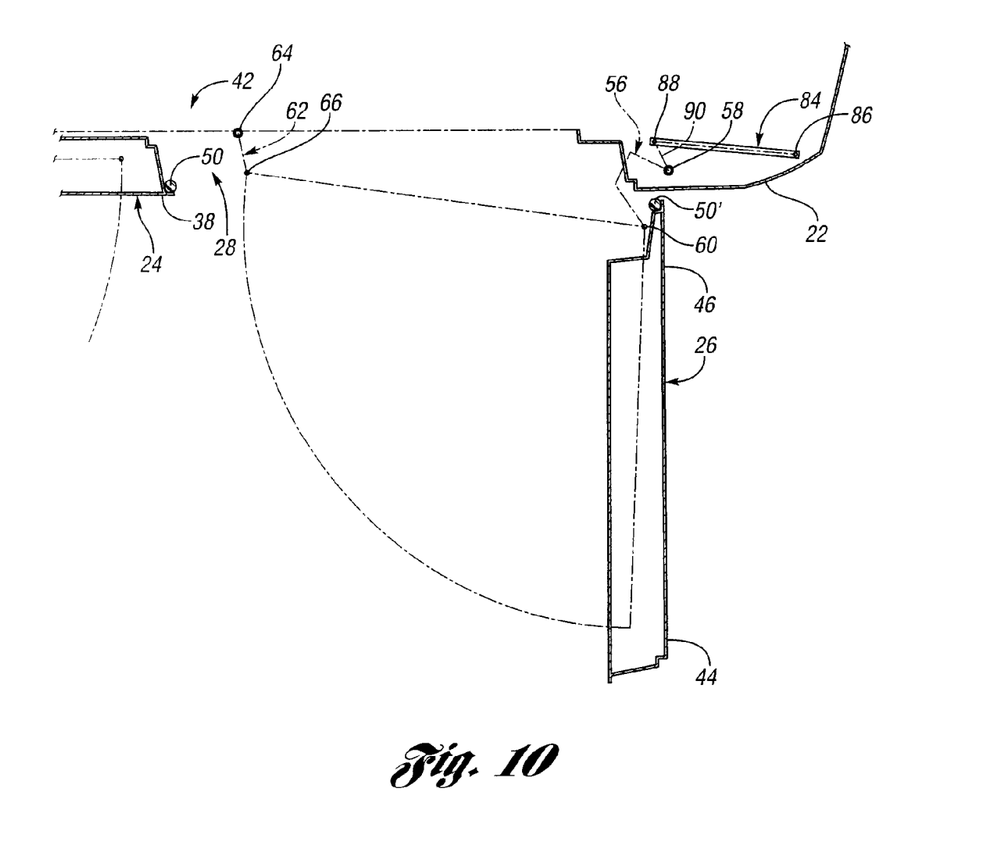
FIG. 10 is a top plan partial section view of the rear door of the automotive vehicle of FIG. 1, illustrated in the open position.

The rear link 56 and the front link 62 collectively translate the rear door 26. Thus, as both the front link 62 and the rear link 56 pivot relative to the vehicle body, the rear door 26 is translated to a first intermediate position as illustrated in FIG. 8. The first intermediate position may be any intermediate position of the rear link 56 and the front link 62 along the corresponding arcuate paths 52, 54 between the closed position in FIG. 7 and the second intermediate position, which is illustrated in FIG. 9.

The second intermediate position may be the position in which the rear door rear end 46 is spaced sufficiently from the vehicle body 22 for pivoting about the second hinge axis 48 at the rear link distal end 60. The second intermediate position of FIG. 9 may also be the position where the rear door front end 44 has sufficient clearance from the front door rear end 38 such that the rear door 26 may be pivoted away from the front door rear end 38. Thus, upon reaching the second intermediate position of FIG. 9, the linkage may be decoupled for opening the rear door 26 to the open position illustrated in FIG. 10.

The link length of the rear link 56 is illustrated greater than that of the front link 62 to space the rear door rear end 46 from the vehicle body side at a greater rate of translation than that of the rear door front end 44. Of course, any link length is contemplated within the spirit and scope of the present invention.

Figure 11:
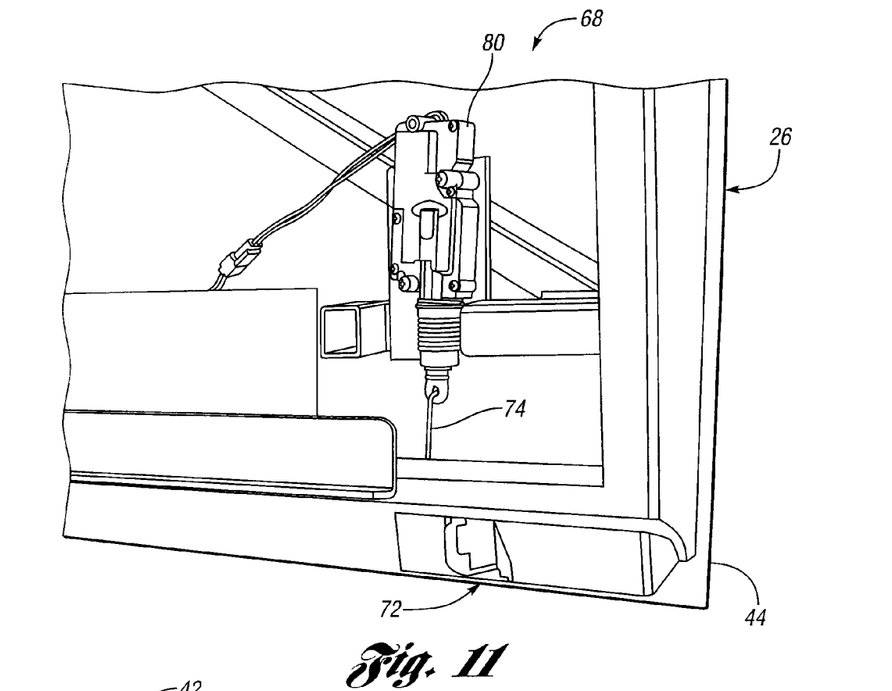
FIG. 11 is an enlarged perspective view of an interior side at a forward region of the rear door of the automotive vehicle of FIG. 1, illustrated partially disassembled with a latch mechanism provided within the door assembly.
Figure 12:
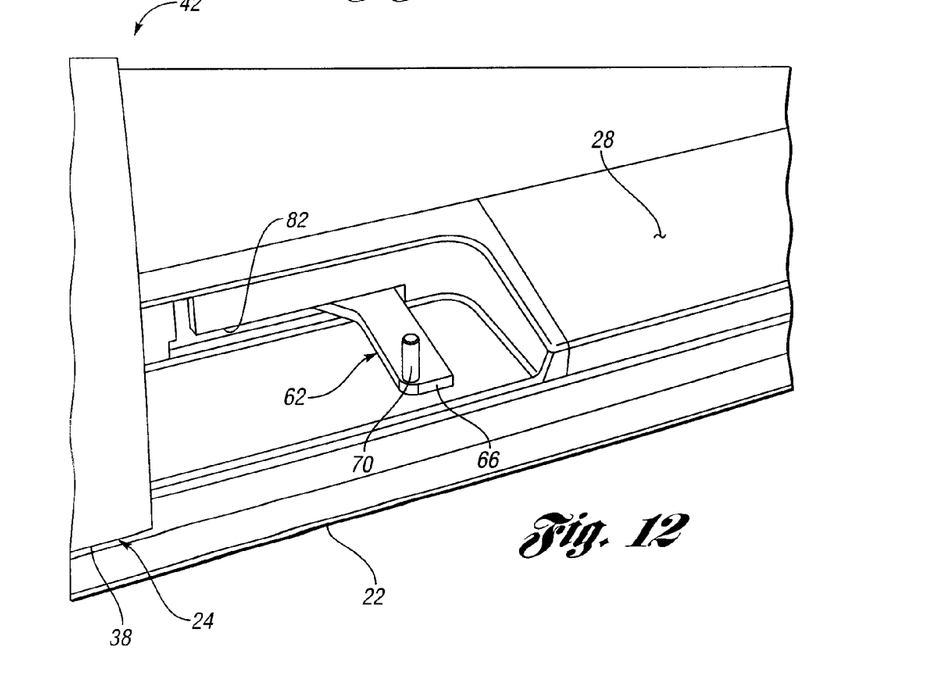
FIG. 12 is an enlarged perspective view of a door opening of the automotive vehicle of FIG. 1, illustrating a striker for engagement with the latch mechanism of FIG. 11.

Referring now to FIG. 11, an interior side of the rear door 26 is illustrated with an interior trim panel removed therefrom for revealing a latch mechanism 68 that is provided for decoupling the linkage of FIGS. 7 to 10. In FIG. 12, a region of the pillarless door opening 28 is illustrated enlarged depicting the front link 62 with a striker pin 70 at the front link distal end 66 for cooperation with the latch mechanism 68 of FIG. 11.

Although the latch mechanism 68 and front link 62 are illustrated in a lower region of the rear door 26 and the pillarless door opening 28, the invention contemplates that the latch mechanism 68 and the front link 62 may be provided on a top region of the rear door 26 and the pillarless door opening 28. Additionally, a pair of latch mechanisms 68 and a pair of front links 62 may be provided at upper and lower regions of the rear door 26 and the pillarless door opening 28. Further, the latch mechanism 68 may be provided on the front link 62 and the striker 70 may be provided on the rear door 26.

Referring again to FIG. 11, the latch mechanism 68 includes a conventional receiver 72 for receiving the striker 70 and locking the striker 70 therein. The latch mechanism 68 includes a release 74 for releasing the striker 70 from the receiver 72. Strikers, receivers and releases are well known in the art of vehicle door latch mechanisms. The release 74 may be mechanically coupled to an exterior door handle 76 (FIGS. 1-3) or an interior door handle 78 (FIGS. 4 and 5) of the rear door 26. Thus, the user may be required to manually release the striker 70 from the receiver 72 in order to pivot the rear door 26 from the intermediate position to the open position.

Likewise, the user may be required to manually translate the rear door 26 from the closed position to the intermediate position in order to open the rear door 26. Alternatively, the latch mechanism 68 may be provided with a solenoid 80 for driving the release 74. Upon receiving a signal indicating that the rear door 26 is in the second intermediate position and that the user has requested to open the rear door 26, the solenoid 80 may drive the release 74 for disengaging the rear door 26 from the front link 62.

In order to close the rear door 26, the user first pivots the rear door 26 until the receiver 72 receives the striker pin 70, thereby locking the rear door 26 to the front link 62. Subsequently, the user may translate the door from the intermediate position to the closed position. Another latch or locking mechanism may be provided for maintaining the door in the closed position.

The front link 62 includes a torsion spring (not shown) at the front link fixed end 64 for biasing the front link 62 to the position illustrated in FIG. 12 corresponding to the second intermediate position of the linkage. Thus, the striker pin 70 is urged to the position for engagement with the receiver 72 when the rear door 26 is pivoted to the second intermediate position. The torsion spring provided on the front link fixed end 64 may be sufficient to bias the link 62 to the position illustrated in FIG. 12, but may be easily overcame by translation of the door from the second intermediate position to the closed position.

Additionally, a cutout 82 may be provided within the vehicle body 22 so that upon disengagement of the latch mechanism 68 from the striker pin 70, the front link 62 may be translated into the vehicle body 22 through the cutout 82 to avoid interference with a passenger whom may be stepping within the door opening 28. A sensor may be provided in the rear door 26 to determine when the rear door 26 is being pivoted partially closed to the second intermediate position. Upon receipt of the signal, the actuator may translate the front link 62 back to the position illustrated in FIG. 12.

The invention contemplates that another latch mechanism 68 may be incorporated into the front door 24 as well, for cooperation with a fixed striker.

Referring again to FIG. 7, a linear actuator 84 is illustrated schematically for driving the rear door 26 between the closed position and the second intermediate position. The linear actuator 84 may be an electrically driven stepper motor with an extendable shaft. Although a linear actuator is illustrated and described, the invention contemplates any actuator, such as rotary actuators, and the invention contemplates any power source, such as spring driven, pneumatic, hydraulic, or the like.

The linear actuator 84 includes a grounded end 86 that is pivotally connected to the vehicle body 22. The linear actuator 84 also includes an extendable end 88 which can be linearly extended from the grounded end 86. The extendable end 88 is pivotally connected to a bell crank 90 that is mounted to the rear link 56. Thus, as the actuator 84 extends the extendable end 88 from the grounded end 86, the bell crank 90 drives the rear link 56 counterclockwise from FIG. 7 to FIG. 9.

Figure 7:
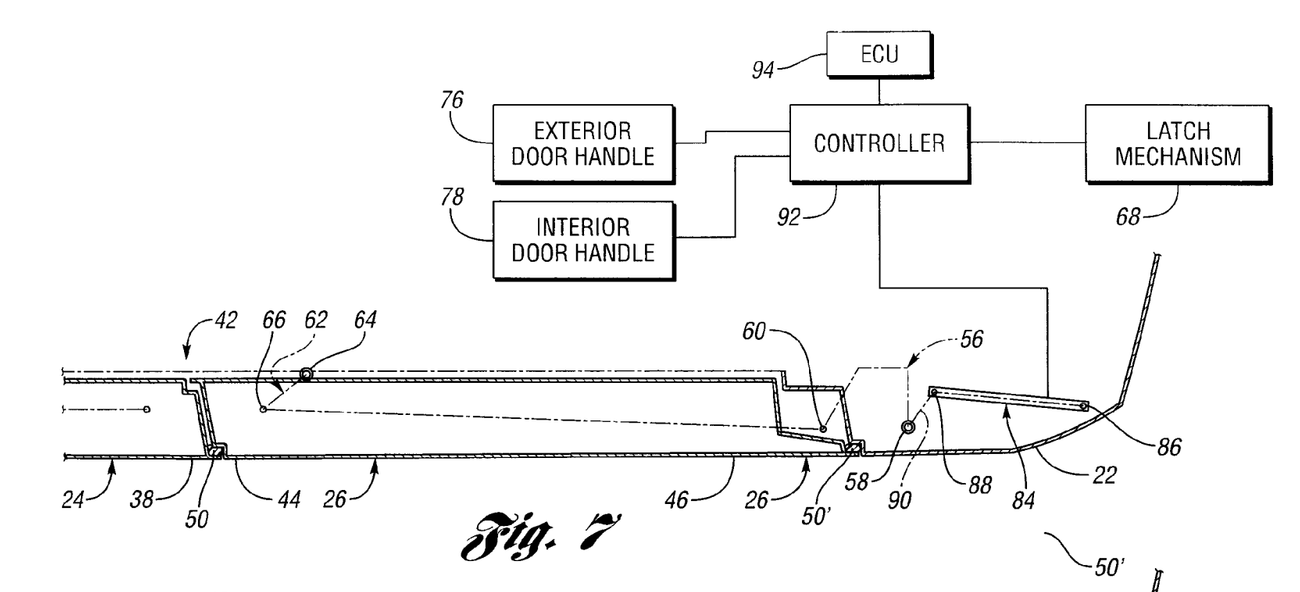
FIG. 7 is a top plan partial section view of the rear door of the automotive vehicle of FIG. 1, illustrated in the closed position.

Likewise, the actuator 84 may be utilized for translating the rear door 26 from the second intermediate position of FIG. 9 to the closed position of FIG. 7 by retracting the extendable end 88 of the actuator 84 towards the grounded end 86. Retraction of extendable end 80 drives the bell crank 90 of the rear link 56 in a clockwise direction from FIG. 9 to FIG. 7.

Referring again to FIG. 7, the actuator 84 is in communication with a controller 92 which controls the actuator 84 to either extend or retract. The exterior door handle 76 and the interior door handle 78 of the rear door 26 include manual switches that send a signal to the controller 92 upon actuation of the corresponding handle 76, 78. Upon receipt of the signal, the controller 92 drives the actuator 84 to translate the rear door 26 from the closed position to the second intermediate position.

Upon reaching the second intermediate position, the controller 92 sends a signal to the latch mechanism 68 to release the front link 62 so that the rear door 26 may be pivoted to the open position. The controller 92 may be in communication with an electronic control unit (ECU) 94 to verify certain conditions before driving the rear door 26 to the intermediate position or unlatching the rear door 26. The ECU 94 may be in communication with the transmission for indicating to the controller 92 that the vehicle is parked. The controller 92 may require that the vehicle be parked in order to translate the rear door 26. The ECU 94 may be in communication with the engine or transmission for indicating a speed of travel of the vehicle to the controller 92. The controller 92 may require the vehicle to be within a velocity range before translating or unlatching the rear door 26. Alternatively, the controller 92 may require that the vehicle be stopped in order to translate or unlatch the rear door 26. Alternatively, the controller 92 may be incorporated within the ECU 94.

When the actuator 84 translates the rear door 26 to the second intermediate position, the actuator 84 may maintain this position so that the receiver 72 of the latch mechanism 68 lines up with the striker pin 70 of the front link 62 when the rear door 26 is pivoted from the open position to the second intermediate position.

Upon receipt of the striker pin 70 within the receiver 72 of the latch mechanism 68, the latch mechanism 68 may send a signal to the controller 92 indicating that the rear door 26 is latched in a second intermediate position. Subsequently, the controller 92 drives the actuator 84 from the extended position illustrated in FIG. 9 back to the retracted position illustrated in FIG. 7 for translating the rear door 26 to the closed position. Upon reaching the closed position of FIG. 7, the actuator 84 may maintain the retracted position for locking the rear door 26 in the closed position.

Figure 13:
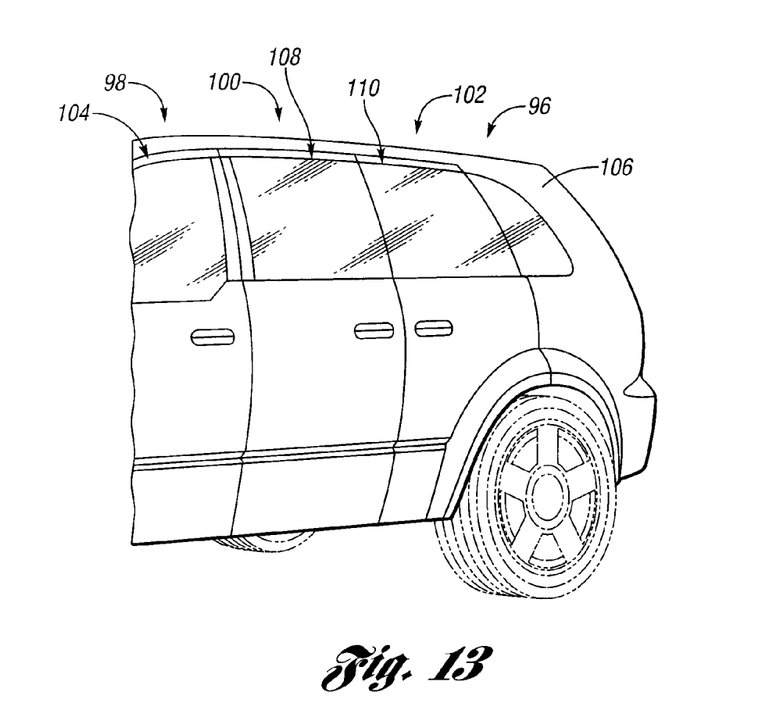
FIG. 13 is a partial perspective view of another automotive vehicle in accordance with the present invention, the automotive vehicle having a first door, a second door, and a third door, which are illustrated in closed positions.

Referring now to FIG. 13, another automotive vehicle 96 is illustrated in accordance with the present invention. The automotive vehicle 96 includes a first seating row 98, a second seating row 100 and a third seating row 102. Likewise, the vehicle 96 includes a first door 104 pivotally connected to a body 106 of the vehicle 96. A second door 108 and a third door 110 are provided for permitting ingress and egress to the second and third seating rows 100, 102. The second and third doors 108, 110 collectively close and seal a pillarless door opening 112 provided between a B-pillar 114, which divides the first seating row 98 and the second seating row 100, and a seat C-pillar 116.

Figure 14:
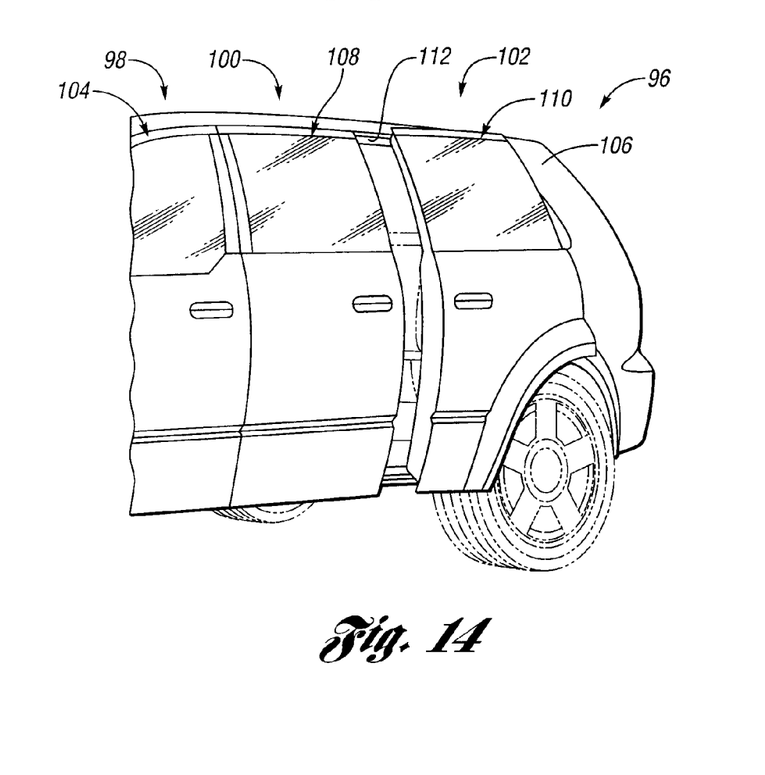
FIG. 14 is a partial perspective view of the automotive vehicle of FIG. 13, illustrated with the third door in an intermediate position.
Figure 15:
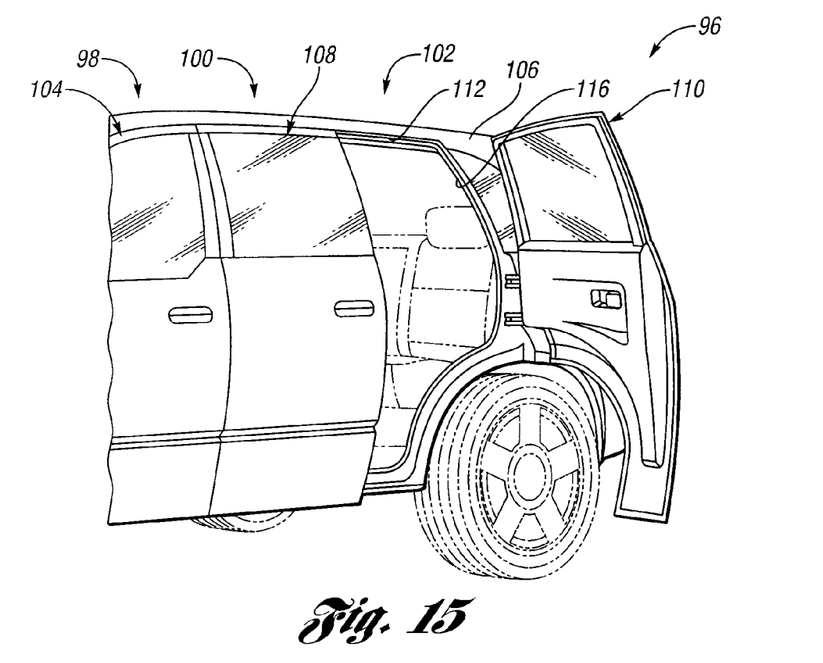
FIG. 15 is a partial perspective view of the automotive vehicle of FIG. 13, illustrated with the third door in an open position.
Figure 16:
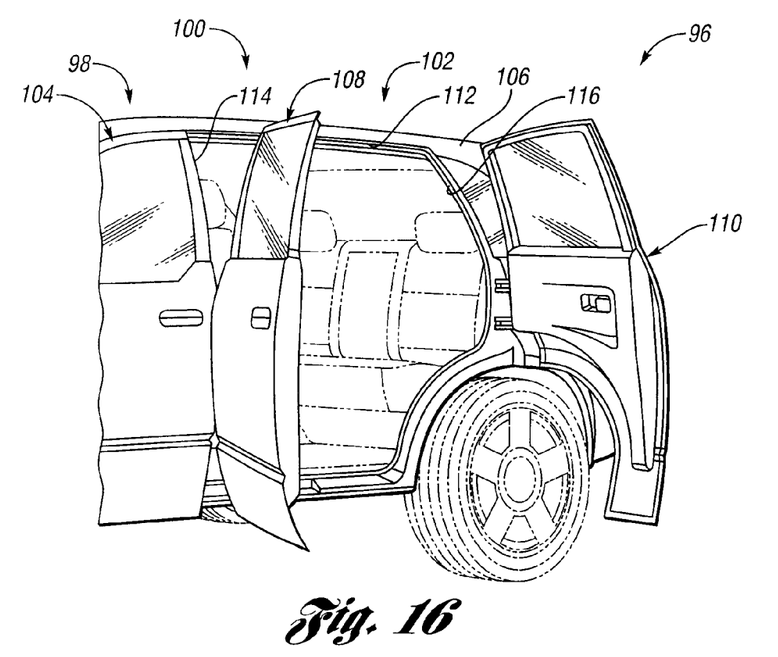
FIG. 16 is a partial perspective view of the automotive vehicle of FIG. 13, illustrated with the second door and the third door in an open position.

The second and third doors 108, 110 may be independently opened by incorporating the teachings of the present invention. The second door 108 may be pivoted from a closed position illustrated in FIGS. 13 to 15 to the open orientation illustrated in FIG. 16. Likewise, the third door 110 may be translated to an intermediate position illustrated in FIG. 14 by utilizing a four bar mechanism, linkage or the like as discussed above with previous embodiments. Subsequently, the third door 110 may be pivoted from the intermediate position in FIG. 14 to the open position illustrated in FIGS. 15 and 16. By providing the pillarless door opening 112, an enlarged opening is provided for ingress and egress to the second and third seating rows 100, 102 as illustrated in FIG. 16. The enlarged opening 112 may be utilized for loading and unloading of cargo into the second and third seating rows 100, 102.

In summary, a door system for a pillarless door opening for adjacent doors is provided wherein the doors may be independently opened. One door may be hinged to the vehicle while the other door is mounted to the vehicle for translation and pivoting for clearing the first door and then permitting pivoting relative to the vehicle. The translation is provided on a fixed path for repeatability and accuracy.

While various embodiments for carrying out the invention have been described in detail, those familiar with the art to which this invention relates will recognize various alternative designs and embodiments for practicing the invention as defined by the following claims.

What is claimed:

1. An automotive vehicle having a body with an opening without a pillar for occupant ingress and egress, the vehicle comprising:
   a first door having a first end pivotally connected to the vehicle about an axis adjacent to a perimeter of a vehicle body opening, and a second end that extends to a central region of the opening in a closed position and that extends away from the opening in an open position;
   a second door having a first end translatably connected to the vehicle adjacent to the perimeter of the opening spaced apart from the first door first end, and a second end translatably connected to the vehicle adjacent to the central region of the opening at a closed position;
   a translatable striker connected to one of the central region of the opening and the perimeter of the opening spaced apart from the first door end;
   a latch mechanism mounted to one of the second door first end and the second door second end for receiving the striker;
   wherein the first door and the second door cooperate to close the opening when both the first door and the second door are in the closed position, and the second door is translatable relative to the vehicle on a fixed path of translation such that the second door first end, the second door second end, and the striker are translated from the vehicle to an intermediate position for providing clearance from the first door when in the closed position, and the latch mechanism is detachable from the striker for pivoting the second door about the other of the second door first end and the second door second end relative to the vehicle from the intermediate position to an open position of the second door.

2. The automotive vehicle of claim 1 wherein the first door and the second door are independently operable for the associated open and closed positions.

3. The automotive vehicle of claim 1 wherein the first door second end and the second door second end cooperate to seal the central region of the vehicle opening.

4. The automotive vehicle of claim 1 wherein the first door second end and the second door second end cooperate to provide lateral structural support to the vehicle body.

5. The automotive vehicle of claim 1 wherein the second door is closed by pivoting the second door to the intermediate position whereby the latch mechanism reconnects with the striker, and translating the second door to the closed position.

6. The automotive vehicle of claim 1 further comprising a four bar mechanism mounting the second door to the vehicle for translating the second door between the closed and intermediate positions, wherein the latch mechanism of the second door is detachable from the four bar mechanism at one of the second door first end and the second door second end for pivoting the second door to the open position.

7. The automotive vehicle of claim 1 further comprising a linkage mounting the second door to the vehicle for translating the second door between the closed and intermediate positions, wherein the latch mechanism of the second door is detachable from the linkage at one of the second door first end and the second door second end for pivoting the second door to the open position.

8. The automotive vehicle of claim 1 wherein the second door first end is pivotally attached to the vehicle and the second door second end includes the latch mechanism.

9. The automotive vehicle of claim 1 wherein the second door is farther defined as a rear door.

10. An automotive vehicle having a body with an opening without a pillar for occupant ingress and egress, the vehicle comprising:
    a first door having a first end pivotally connected to the vehicle about an axis adjacent to a perimeter of a vehicle body opening, and a second end that extends to a central region of the opening in a closed position and that extends away from the opening in an open position;
    a second door having a first end translatably connected to the vehicle adjacent to the perimeter of the opening spaced apart from the first door first end, and a second end translatably connected to the vehicle adjacent to the central region of the opening at a closed position;
    a first link pivotally connected to the vehicle body adjacent the perimeter of the vehicle body opening and pivotally connected to the second door first end; and
    a second link pivotally connected the vehicle body adjacent the central region of the vehicle body opening, and pivotally connected to the second door second end;
    wherein the first door and the second door cooperate to close the opening when both the first door and the second door are in the closed position, and the second door is translatable relative to the vehicle on a fixed path of translation such that the second door first end and the second door second end are translated from the vehicle to an intermediate position for providing clearance from the first door when in the closed position, and one of the second door first end and the second door second end is detachable from the vehicle for pivoting the second door about the other of the second door first end and the second door second end relative to the vehicle from the intermediate position to an open position of the second door; and
    wherein the fixed path of translation of the second door between the closed position and the intermediate position is defined by the first link and the second link.

11. The automotive vehicle of claim 10 wherein the first link has a length greater than that of the second link to translate the second door first end away from the vehicle as the second door second end is translated away from the first door second end and the vehicle.

12. The automotive vehicle of claim 10 further comprising a latch mechanism pivotally connecting the second door to one of the first link and the second link for decoupling the second door from the link and pivoting the second door to the open position.

13. The automotive vehicle of claim 10 further comprising an actuator operably connected to the vehicle and one of the second door, the first link and the second link for driving the door from the closed position to the intermediate position.

14. The automotive vehicle of claim 13 further comprising:
a manual switch; and
a controller in communication with the manual switch for receiving an input from the manual switch, the controller being in communication with the actuator for driving the door from the closed position to the intermediate position in response to the input.

15. The automotive vehicle of claim 14 wherein the manual switch further comprises a door handle for providing the manual switch input and for manual actuation of the second door from the intermediate position to the open position.

16. The automotive vehicle of claim 14 wherein the controller is in communication with the vehicle to verify that the vehicle is parked before driving the actuator.

17. The automotive vehicle of claim 16 further comprising: a latch mechanism pivotally connecting the second door to one of the first link and the second link for decoupling the second door from the link, the controller being in communication with the latch mechanism for decoupling the second door from the link after the second door is translated from the closed position to the intermediate position.

18. The automotive vehicle of claim 17 wherein the latch mechanism senses a latched condition associated with the second door being pivoted from the open position to the intermediate position, and the latch mechanism communicates the latched condition to the controller, whereby the controller drives the actuator to translate the second door from the intermediate position to the closed position.

19. An automotive vehicle having a pair of opposed outwardly opening doors on one side of a vehicle body which cooperate to enclose a pillarless door opening, the vehicle comprising:
a forward door hinged to the vehicle adjacent a front edge of a pillarless door opening for pivotal movement about a generally vertical first hinge axis between an open position and a closed position;
a forward door latch mechanism for releasably latching the forward door to the vehicle body;
a rearward door hinged to the vehicle adjacent a rear edge of the pillarless door opening and having a spaced apart front edge and a rear edge sized to close the pillarless door opening in cooperation with the forward door when in the closed position;
a rear link member having a fixed end, pivotally attached to the vehicle adjacent the rear edge of the pillarless door opening, and a distal end which is movable along an arcuate path and is pivotally attached to the rearward door adjacent the rear edge thereof enabling rotation of the rearward door about a generally vertical second hinge axis between an open position and a substantially closed position;
a front link member having a fixed end pivotally attached to the pillarless door opening forward of the rearward link member and having a distal end movable along an arcuate path about the first end;
a releasable connector oriented adjacent the front edge of the rearward door for releasably engaging the distal end of the front link member; and
a locking mechanism cooperating with the vehicle body and at least one of the rearward door and rear link member, wherein the rear link member is capable of pivoting between an outwardly extended state with the rearward door in the substantially closed position and with the releasable connector engaging the distal end of the front link member, and an inwardly retracted locked state in which the rearward door is moved forward and inward to a closed state and securely held within the pillarless door opening.

20. An automotive vehicle having a pair of opposed outwardly opening doors on one side of a vehicle body which cooperate to enclose a pillarless door opening, the vehicle comprising:
a forward door hinged to the vehicle adjacent a front edge of a pillarless door opening for pivotal movement about a generally vertical first hinge axis between an open position and a closed position;
a forward door latch mechanism for releasably latching the forward door to the vehicle body;
a rearward door hinged to the vehicle adjacent a rear edge of the pillarless door opening and having a spaced apart front edge and a rear edge sized to close the pillarless door opening in cooperation with the forward door when in the closed position;
a rear link member having a fixed end, pivotally attached to the vehicle adjacent the rear edge of the pillarless door opening, and a distal end which is movable along an arcuate path and is pivotally attached to the rearward door adjacent the rear edge thereof enabling rotation of the rearward door about a generally vertical second hinge axis between an open position and a substantially closed position;
a rearward door forward latch assembly having a first latch member affixed to the vehicle and a corresponding second latch member affixed to the rear door adjacent the front edge, wherein one of the first and second latch members releasably engages the other at an engagement location allowing limited forward movement of the rear door relative to the vehicle body while the first and second latch members are engaged; and
a locking mechanism cooperating with the vehicle body and rear link member, wherein the rear link member is capable of pivoting between an outwardly extended state with the rearward door in the substantially closed position and with the first and second latch members initially engaged, and an inwardly retracted locked state in which the rearward door is moved forward and inward to a closed state and securely held within the pillarless door opening.

* * * * *